United States Patent
Chen et al.

(10) Patent No.: US 8,132,032 B2
(45) Date of Patent: Mar. 6, 2012

(54) ELECTRONIC DEVICE FOR REDUCING POWER CONSUMPTION DURING SLEEP MODE OF COMPUTER MOTHERBOARD AND MOTHERBOARD THEREOF

(75) Inventors: Chung-Wen Chen, Taipei (TW); Chung-Te Yeh, Taipei (TW)

(73) Assignee: MSI Computer (Shenzhen) Co. Ltd., Shenzhen (CN)

( * ) Notice: Subject to any disclaimer, the term of this patent is extended or adjusted under 35 U.S.C. 154(b) by 428 days.

(21) Appl. No.: 12/422,118

(22) Filed: Apr. 10, 2009

(65) Prior Publication Data
US 2010/0262849 A1 Oct. 14, 2010

(51) Int. Cl.
*G06F 1/26* (2006.01)
*G06F 1/32* (2006.01)

(52) U.S. Cl. ............... 713/320; 713/1; 713/2; 713/324; 713/323

(58) Field of Classification Search .................. 713/1, 2, 713/320, 324, 323
See application file for complete search history.

(56) References Cited

U.S. PATENT DOCUMENTS

| | | | | |
|---|---|---|---|---|
| 6,308,278 | B1* | 10/2001 | Khouli et al. | 713/323 |
| 6,446,213 | B1* | 9/2002 | Yamaki | 713/300 |
| 6,542,996 | B1* | 4/2003 | Chang et al. | 713/300 |
| 7,489,579 | B2* | 2/2009 | Ho | 365/222 |
| 2003/0188115 | A1* | 10/2003 | Maezawa | 711/162 |
| 2004/0107310 | A1* | 6/2004 | Lin | 711/106 |
| 2005/0071692 | A1* | 3/2005 | Chaiken et al. | 713/300 |
| 2007/0171751 | A1* | 7/2007 | Ho | 365/222 |
| 2007/0219644 | A1* | 9/2007 | Sonobe | 700/12 |
| 2008/0082815 | A1* | 4/2008 | Kawano et al. | 713/2 |
| 2009/0106573 | A1* | 4/2009 | Lin | 713/324 |

* cited by examiner

*Primary Examiner* — Vincent Tran
(74) *Attorney, Agent, or Firm* — Apex Juris, pllc; Tracy M. Heims

(57) ABSTRACT

A power-saving electronic device for use with a computer motherboard in a "suspend to memory" state is disclosed. The power-saving electronic device enables compulsory interruption of power supply to a south bridge chip and a super input output (SIO) chip of the computer motherboard in the "suspend to memory" state, such as an S3 state of Advanced Configuration and Power Interface (ACPI), so as to save power. After a user presses a power switch, the power-saving electronic device enables the south bridge chip and SIO chip to be powered on by a standby power supplied thereto and enables the computer motherboard to remain capable of awakening and resuming from the S3 state.

21 Claims, 4 Drawing Sheets

ELECTRONIC DEVICE FOR REDUCING POWER CONSUMPTION DURING SLEEP MODE OF COMPUTER MOTHERBOARD AND MOTHERBOARD THEREOF

FIELD OF THE INVENTION

The present invention relates to power-saving computer motherboards, and more particularly, to a computer motherboard capable of compelling interruption of power supply to a south bridge chip and a super input output (SIO) chip in an S3 state ("suspend to memory" state) of ACPI (Advanced Configuration and Power Interface) so as to save power.

BACKGROUND OF THE INVENTION

Upon its entry into an S3 state of Advanced Configuration and Power Interface (ACPI) (hereinafter referred to as ACPI S3), that is, a "suspend to memory" state, a conventional computer motherboard begins to operate in a standby power-saving mode, but some of the chips of the conventional computer motherboard, such as a main memory, a south bridge chip, a north bridge chip, a super input output (SIO) chip, and a memory controller, continue to consume power, and even the CPU cannot stop consuming power, and in consequence reduction of power consumption is not efficient at all. To save power, it is necessary to minimize the power consumption of power-consuming parts and components of the conventional computer motherboard one by one or even bring the power-consuming parts and components to a sleep mode in a program-controllable manner for power saving. However, with the south bridge chip being in control of ACPI and the SIO chip being in control of startup and shutdown, neither the south bridge chip nor the SIO chip can be shut down while in the "suspend to memory" state. Computer motherboards are designed, depending on chipsets for use therewith. Likewise, parts and components of computer motherboards are controlled differently. Hence, it is slow and laborious to develop a computer motherboard whose power-consuming parts and components can be brought to a power-saving mode or a sleep mode one by one, not to mention that a computer motherboard thus developed is intricate, expensive, and incompatible with parts and components of variant design.

U.S. Pat. No. 6,266,776, entitled ACPI Sleep Control, discloses: when the state of an internal battery or an external power supply changes, the change is detected by an embedded controller; the operating system is informed of this change using a power management event signal POWER_PME and an SCI interrupt; and in accordance with the change in power supply state by the internal battery or the external power supply, the current system state changes to another system state. However, U.S. Pat. No. 6,266,776 does not disclose interrupting power supply to a south bridge chip and a SIO chip of a computer motherboard in ACPI S3 so as to save power.

The inventor of the present invention realized the drawbacks of the conventional computer motherboard and endeavored to overcome the drawbacks by inventing a power-saving electronic device for use with a computer motherboard in a "suspend to memory" state.

SUMMARY OF THE INVENTION first objective of the present invention provides a power-saving electronic device for reducing the power consumed by a computer motherboard in a "suspend to memory" state.

A second objective of the present invention provides a computer motherboard capable of compelling interruption of power supply to a south bridge chip and a super input output (SIO) chip in a "suspend to memory" state so as to save power.

To achieve the first objective of the present invention, the present invention provides a power-saving electronic device for use with a computer motherboard in a "suspend to memory" state. The power-saving electronic device comprises: a first device controlled by a second device and configured to controllably determine whether a first standby power forms a close circuit or an open circuit with a south bridge chip and a super input output (SIO) chip of the computer motherboard; and the second device for determining whether the computer motherboard is in the "suspend to memory" state so as for the first standby power to form an open circuit with the south bridge chip and the SIO chip under control of the first device upon a positive determination, generating a memory power control signal, enabling a second standby power to form a close circuit with a memory controller and a main memory of the computer motherboard so as to maintain an ON state when switched by a memory power controller and allow the computer motherboard to enter a "suspend to memory" state, receiving a power switch signal generated by a power switch, and enabling the first standby power to form a close circuit with the south bridge chip and the SIO chip under control of the first device upon receipt of the power switch signal.

To achieve the second objective of the present invention, the present invention provides a computer motherboard, comprising: a south bridge chip electrically connected to a first device; a super input output (SIO) chip electrically connected to the first device; the first device controlled by a second device and configured to controllably determine whether a first standby power forms a close circuit or an open circuit with the south bridge chip and the SIO chip; the second device for determining whether the computer motherboard is in the "suspend to memory" state so as for the first standby power to form the open circuit with the south bridge chip and the SIO chip under control of the first device upon a positive determination, generating a memory power control signal, enabling a second standby power to form a close circuit with a memory controller and a main memory of the computer motherboard so as to maintain an ON state when switched by a memory power controller and allow the computer motherboard to enter a "suspend to memory" state, receiving a power switch signal generated by a power switch, and enabling the first standby power to form the close circuit with the south bridge chip and the SIO chip under control of the first device upon receipt of the power switch signal; and a basic input and output system (BIOS) comprising a code for use in: storing a flag in a memory unit whenever the computer motherboard is in the "suspend to memory" state; checking the flag and determining whether a preceding state of the computer motherboard is the "suspend to memory" state as soon as power supply to the south bridge chip and the SIO chip resumes; and executing, upon a positive determination, awakening and resuming from the "suspend to memory" state.

BRIEF DESCRIPTION OF THE DRAWINGS

To enable persons skilled in the art to gain insight into the structures, features, and effects of use of the present invention, the present invention is hereunder illustrated with preferred embodiments in conjunction with the accompanying drawings, wherein.

DETAILED DESCRIPTION OF THE INVENTION

Figure 1:
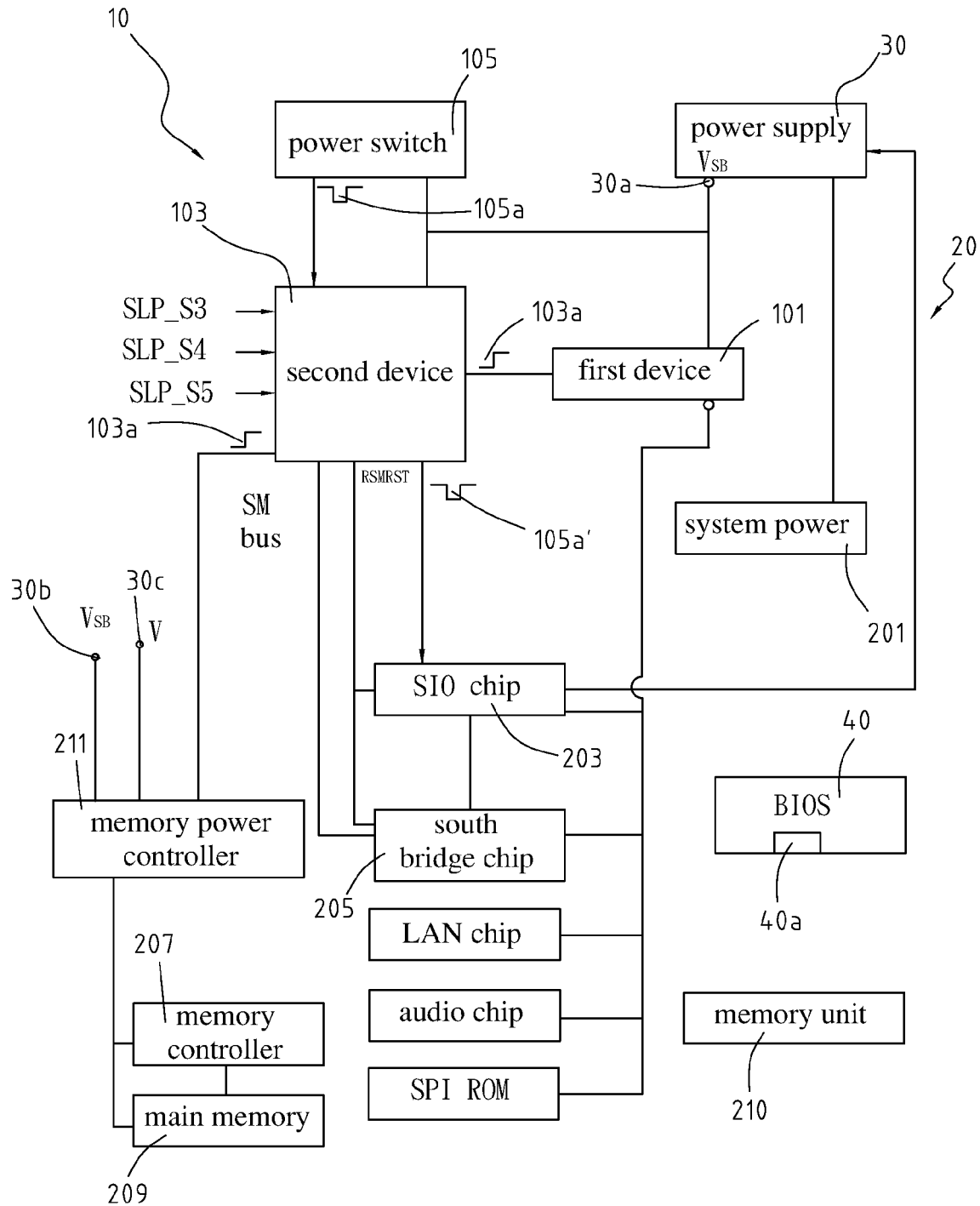
FIG. 1 is a schematic view of the framework of a power-saving electronic device for use with a computer motherboard in a "suspend to memory" state according to the present invention.
Figure 2:
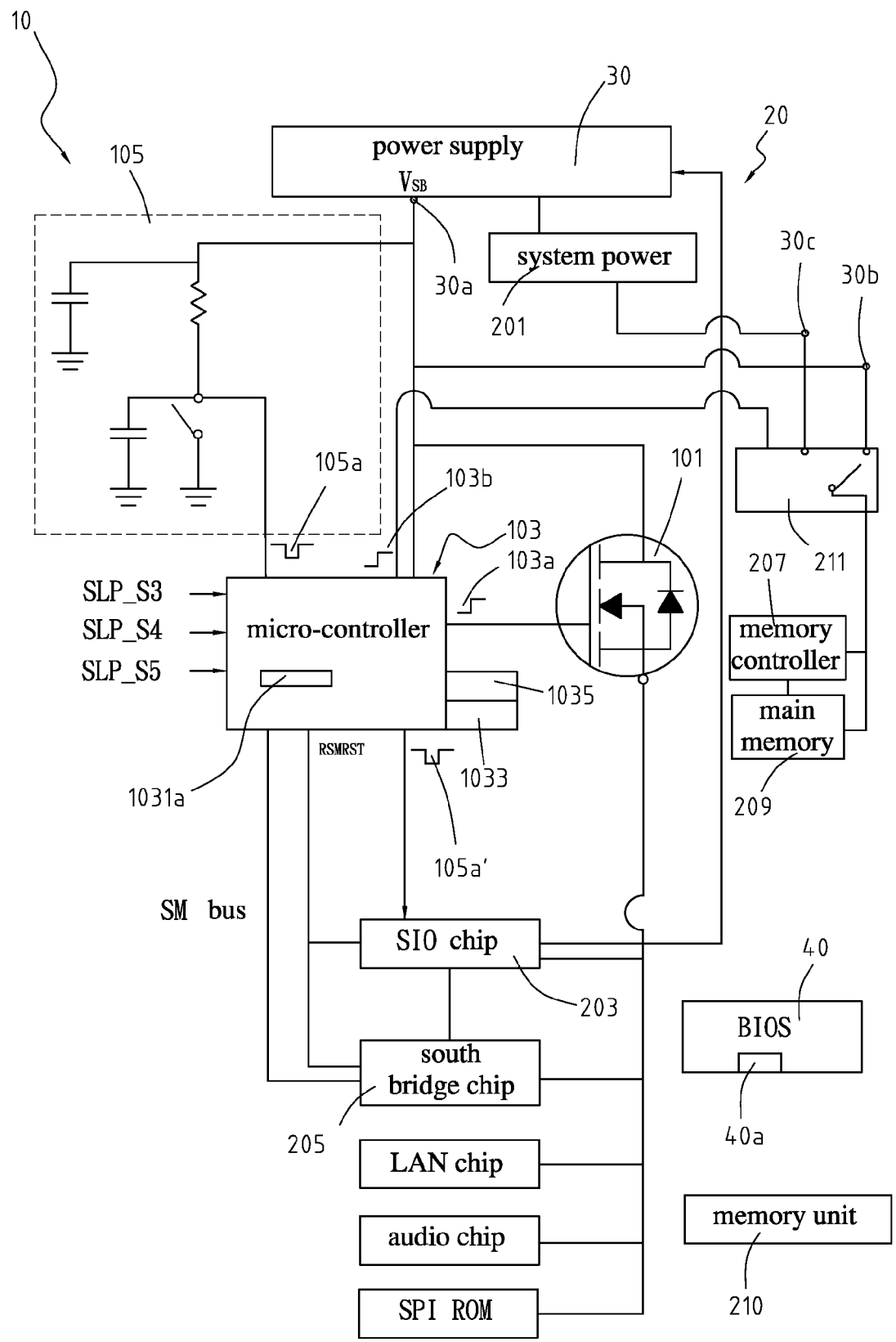
FIG. 2 is a schematic view of a preferred embodiment of the power-saving electronic device shown in FIG. 1 according to the present invention.

Please refer to FIGS. 1 and 2. To facilitate description of the present invention and let persons skilled in the art gain insight into the present invention, FIGS. 1 and 2 show components of a computer motherboard 20 of the present invention on condition that the components are directly related to the present invention; in other words, irrelevant components of the computer motherboard 20 are omitted from the drawings. A power-saving electronic device 10 for use with the computer motherboard 20 saves power as soon as the computer motherboard 20 enters a "suspend to memory" state. The computer motherboard 20 is, for example, compatible with Advanced Configuration and Power Interface (ACPI) and capable of entering an S3 "suspend to RAM" state of ACPI (hereinafter referred to as ACPI S3). Persons skilled in the art are well aware that, upon its entry into ACPI S3, a conventional host computer is not effective in power saving, because some of the parts and components of the conventional host computer in ACPI S3 still consume standby power. For instance, a serial peripheral interface (SPI), read-only memory (ROM), LAN chip, audio chip, south bridge chip, and super input output (SIO) chip still consume standby power in ACPI S3. By contrast, as disclosed in the present invention, after the computer motherboard 20 equipped with the power-saving electronic device 10 enters ACPI S3, the power-saving electronic device 10 discontinues power supply to a south bridge chip 205 and a SIO chip 203. In the situation where the same power source is shared by the south bridge chip 205, the SIO chip 203, a SPI ROM, a LAN chip, and an audio chip of the computer motherboard 20, the power-saving electronic device 10 discontinues power supply to the SPI ROM, LAN chip, and audio chip as well. Meanwhile, power supply to the power-saving electronic device 10, a memory controller 207, and a main memory 209 of the computer motherboard 20 remains unchanged.

Differences in standby power consumption between a conventional computer motherboard and the computer motherboard 20 of the present invention, in ACPI S3, are shown in a comparative table as follows:

| Electronic Parts and Components | Does a conventional computer motherboard consume standby power? | Does the computer motherboard of the present invention consume standby power? |
| --- | --- | --- |
| memory controller | yes | yes |
| main memory | yes | yes |
| south bridge chip | yes | no |
| SIO chip | yes | no |
| LAN chip | yes | no |
| audio chip | yes | no |
| SPI ROM | yes | no |
| power-saving electronic device 10 | no | yes |

According to the comparative table, the computer motherboard 20 equipped with the power-saving electronic device 10 reduces standby power consumption better than the conventional computer motherboard, and computer motherboard 20 equipped with the power-saving electronic device 10 even overcomes a drawback of the prior art, that is, a conventional host computer fails to discontinue power supply to the south bridge chip and SIO chip in an S3 state.

The power-saving electronic device 10 of the present invention reduces power consumed by the computer motherboard 20 operating in a "suspend to memory" state and waiting for awakening. For instance, configured for use with the computer motherboard 20 in ACPI S3, the power-saving electronic device 10 comprises a first device 101 and a second device 103, as described in detail hereunder. To work in conjunction with the power-saving electronic device 10, the memory controller 207 and main memory 209 of the computer motherboard 20 have a power source controllably switched between a second standby power 30b and a power 30c by a memory power controller 211. The memory power controller 211 is controlled by the second device 103. In an embodiment, the power 30c is a power from a system power 201, such as 5V, 3V, 5 $V_{SB}$, 3 $V_{SB}$, or 3.3 $V_{SB}$. In an embodiment, the second standby power 30b is a standby power from a power supply 30, such as 5V standby power, 3V standby power, or 3.3V standby power. In an embodiment, the main memory 209 is a single in-line memory module (SIMM), such as DDR, DDR2, or DDR3.

The primary function of the first device 101 is to controllably determine whether a first standby power 30a forms a close circuit or an open circuit with at least a south bridge chip 205 and a super input output (SIO) chip 203 of the computer motherboard 20. The first device 101 is a MOSFET, such as N-MOSFET or P-MOSFET. The second device 103 controls the gate of the MOSFET, so as to controllably determine whether the first standby power 30a forms a close circuit or an open circuit with at least the south bridge chip 205 and SIO chip 203.

The power supply 30 is an ATX power supply, for example. The first standby power 30a is, for example, a standby power of the ATX power supply, such as 5V standby power, 3V standby power, or 3.3V standby power. For instance, the N-MOSFET features connection of one of a plurality of signal output ends of the second device 103 to the gate, connection of the drain to the first standby power 30a, and connection of the source to a plurality of pins of the south bridge chip 205 and the SIO chip 203.

The source of the N-MOSFET is further connected to a plurality of pins of the SPI ROM, the LAN chip, and the audio chip.

Functions of the second device 103 are described hereunder. The second device 103 has first functionality: receiving a power switch signal 105a generated by a power switch 105; and enabling, upon receipt of the power switch signal 105a, the first device 101 to control the first standby power 30a so as for the first standby power 30a in the control of the first device 101 to form a close circuit with at least the south bridge chip 205 and SIO chip 203.

In an embodiment, the second device 103 essentially comprises a micro-controller 1031. Upon its receipt of the power switch signal 105a, the micro-controller 1031 sends a conduction control signal 103a to the gate of the N-MOSFET 101 so as to bring the N-MOSFET 101 to an ON state, and in consequence the first standby power 30a forms a close circuit with at least the south bridge chip 205 and SIO chip 203.

Meanwhile, power supply to the SPI ROM, the LAN chip, and the audio chip resumes.

The second device 103 has second functionality: determining whether the computer motherboard 20 is in the "suspend to memory" state so as for the first standby power 30a to form an open circuit with at least the south bridge chip 205 and SIO chip 203 under the control of the first device 101 upon a positive determination; generating a memory power control signal 103b and sending the memory power control signal 103b to the memory power controller 211; and enabling the memory power controller 211 to switch the second standby power 30b to the memory controller 207 and the main memory 209 such that power supply to the memory controller 207 and the main memory 209 is maintained rather than interrupted.

An embodiment of the second function of the second device 103 is described hereunder. The micro-controller 1031 receives signals, such as SLP_S3 or SLP_S5, from the south bridge chip 205 so as to determine whether the computer motherboard 20 is in ACPI S3, and, upon a positive determination, instructs the N-MOSFET 101 to hibernate so as for the first standby power 30a to form an open circuit with at least the south bridge chip 205 and SIO chip 203.

Meanwhile, the micro-controller 1031 determines whether the computer motherboard 20 is in ACPI S3 and sends, upon a positive determination, the memory power control signal 103b to the memory power controller 211. Upon its receipt of the memory power control signal 103b, the memory power controller 211 begins switching, thereby allowing the second standby power 30b to form a close circuit with the memory controller 207 and main memory 209. Hence, during ACPI S3, power supply to the memory controller 207 and the main memory 209 is maintained rather than interrupted.

In addition, the SPI ROM, the LAN chip, and the audio chip form an open circuit with the first standby power 30a.

The second device 103 has a third function, that is, after receiving the power switch signal 105a, the second device 103 reproduces the power switch signal 105a and sends a power switch signal 105a' thus reproduced to the SIO chip 203 of the computer motherboard 20.

An embodiment of the third function of the second device 103 is described hereunder. Upon receipt of the power switch signal 105a by the micro-controller 1031, a built-in power switch signal reproducing circuit (not shown) provided in the micro-controller 1031 reproduces the power switch signal 105a and sends a power switch signal 105a' thus reproduced to the SIO chip 203 of the computer motherboard 20. Alternatively, upon its receipt of the power switch signal 105a, the micro-controller 1031 executes a program to control the voltage level at an output port of the micro-controller 1031 so as for the thus-reproduced power switch signal 105a' to be sent from the output port to the SIO chip 203 of the computer motherboard 20.

The computer motherboard 20 receiving power from the first standby power 30a still generates signal RSMRST (the signal RSMRST is, for example, generated by the second device 103 or the SIO chip 203) and sends the signal RSMRST to the south bridge chip 205. The second device 103 awaits during a predetermined period of time, that is, the time the second device 103 takes to wait for completion of generation of the signal RSMRST by the computer motherboard 20, such as 100 ms.

After bringing the N-MOSFET 101 to an ON state, the micro-controller 1031 awaits for a predetermined period of time, that is, 100 ms. At the end of the predetermined period of 100 ms (that is, the moment when the computer motherboard 20 has finished generating the signal RSMRST), the micro-controller 1031 generates the power switch signal 105a' and sends the power switch signal 105a' thus generated to the SIO chip 203. Upon receipt of the power switch signal 105a' by the SIO chip 203, the computer motherboard 20 executes the follow-up procedure of awakening from S3 state to S0 state.

The N-MOSFET in the power on state is likely to be overloaded and burned out when subjected to instantaneous overcurrent. To avoid the mishap, the present invention discloses a soft start circuit unit 1033. The soft start circuit unit 1033 can adopt a conventional circuit.

To increase a control voltage with a view to using low-cost field-effect transistors (FET), the present invention discloses a charge pump circuit unit 1035. The charge pump circuit unit 1035 can adopt a conventional circuit.

The second device 103 of the present invention can be implemented as an application-specific integrated circuit (ASIC).

The south bridge chip 205, the SIO chip 203, the memory controller 207, and the main memory 209 can adopt conventional components.

The memory power controller 211 can adopt a conventional electronic switch or a conventional electronic switching circuit.

The power-saving electronic device 10 of the present invention is disposed on the computer motherboard 20; alternatively, the power-saving electronic device 10 of the present invention is integrated with the SIO chip 203 of the computer motherboard 20.

In an embodiment, the system power 201 is a power source of an ATX power source interface (connector) for use with the computer motherboard 20, and the ATX power source interface is connected to the power supply 30 via a cable.

A built-in memory 1031a of the micro-controller 1031 functions as firmware. A code required for execution of the first, second, and third functions of the second device 103 is stored in the built-in memory 1031a. The micro-controller 1031 is connected to the south bridge chip 205 via an SM bus; hence, new firmware for the micro-controller 1031 is updated via the SM bus.

To enable the power-saving electronic device 10 to discontinue power supply to the south bridge chip 205 and SIO chip 203, a code 40a is added to a basic input and output system (BIOS) 40 of the computer motherboard 20 of the present invention. The code 40a is required for storing a flag in a memory unit whenever the computer motherboard 20 is in a "suspend to memory" state. The code 40a is required for checking the flag whenever power supply to the south bridge chip 205 and SIO chip 203 resumes, so as to determine whether a preceding state of the computer motherboard 20 is the "suspend to memory" state and execute, upon a positive determination, awakening and resuming from the "suspend to memory" state.

Figure 3:
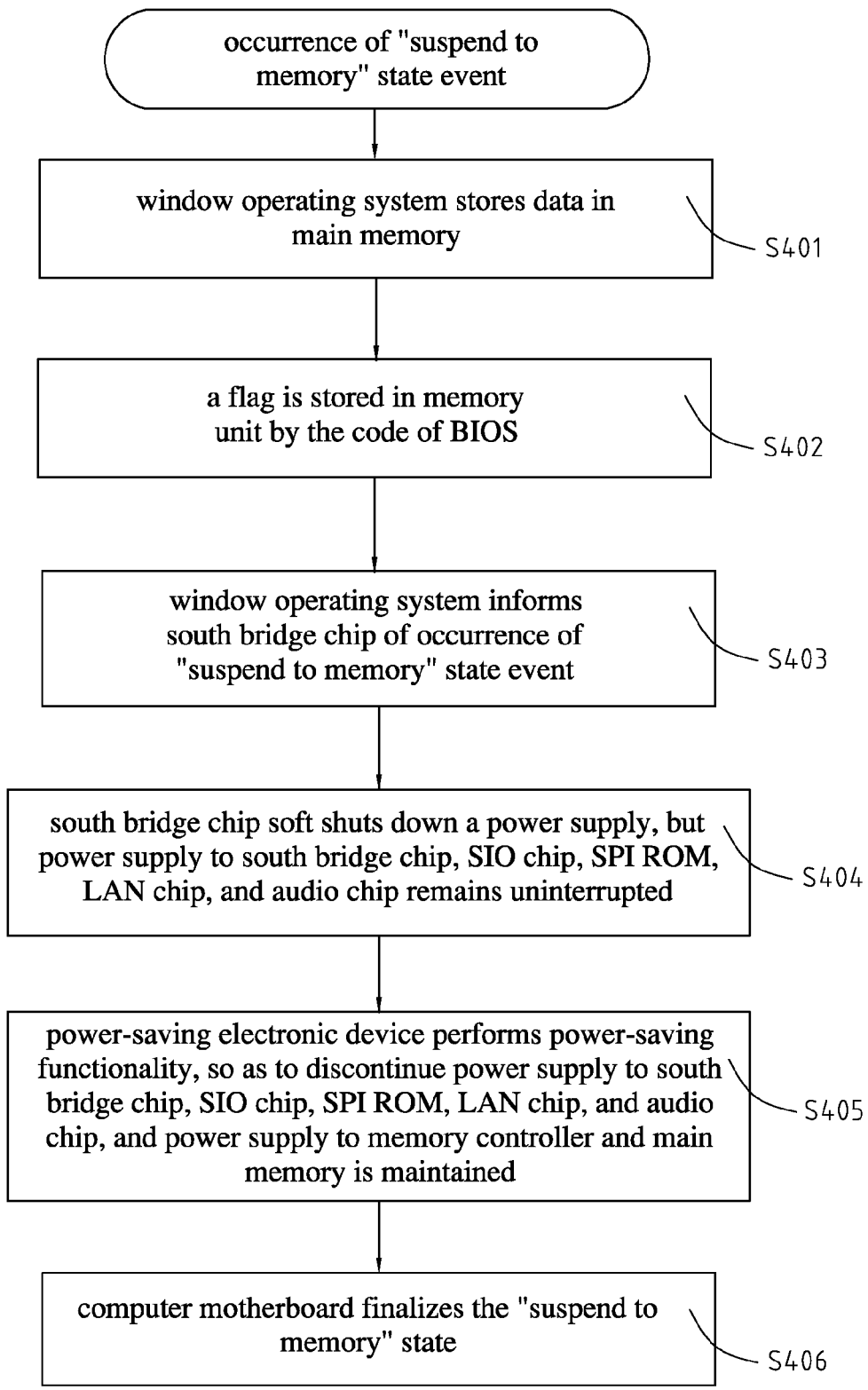
FIG. 3 is a flowchart of processing a "suspend to memory" state event by the computer motherboard of the present invention.

Referring to FIG. 3, once a "suspend to memory" state event (e.g., ACPI S3 event) occurs to the computer motherboard 20, a window operating system (e.g., Windows™ of Microsoft™) stores related data in the main memory 209

(S401). Then, the flag is stored in the memory unit 210 by means of the code 40a in the BIOS 40 (S402). Afterward, the window operating system informs the south bridge chip 205 of the occurrence of the "suspend to memory" state event (S403). In response to the notification, the south bridge chip 205 soft shuts down the power supply 30, but power supply to the south bridge chip 205, the SIO chip 203, the SPI ROM, the LAN chip, and the audio chip remains uninterrupted (S404). Then, the power-saving electronic device 10 performs the aforesaid power-saving functionality, so as to discontinue power supply to the south bridge chip 205, the SIO chip 203, the SPI ROM, the LAN chip, and the audio chip. The memory power controller 211 switches to the second standby power 30b by the memory power control signal 103b such that power supply to the memory controller 207 and the main memory 209 is maintained rather than interrupted (S405).

Afterward, the computer motherboard 20 finalizes the S3 state (S406),

The steps S401, S403, S404, and S406 illustrated with FIG. 3 are attributable to the prior art related to a known way to cope with an S3 event. It should be noted that, compared to the prior art, the present invention includes new steps, such as S402 and S405, to enhance the power-saving functionality of the computer motherboard 20 and enable recordation of occurrence of an S3 event to the computer motherboard 20.

Figure 4:
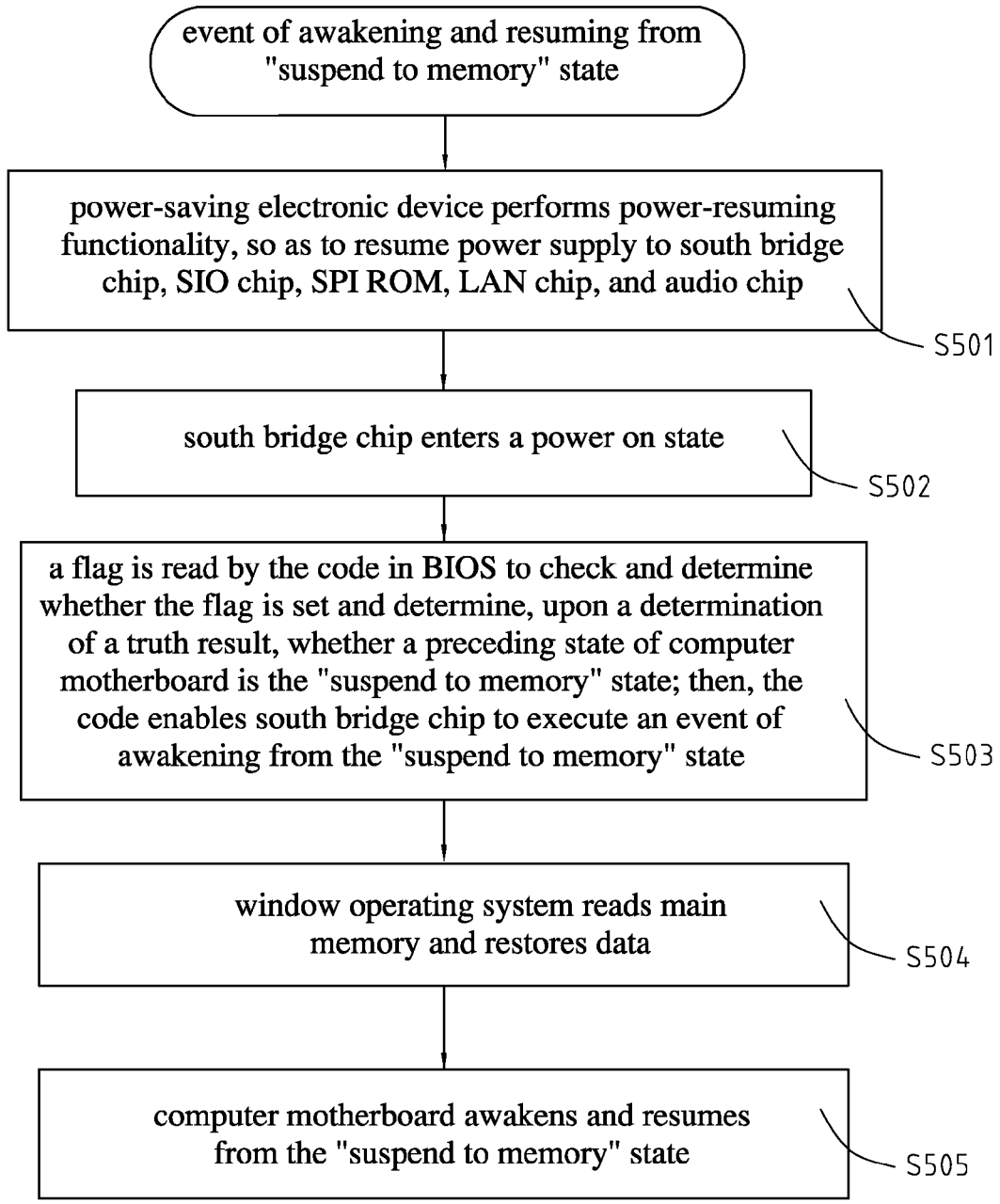
FIG. 4 is a flowchart of processing awakening and resuming from the "suspend to memory" state by the computer motherboard of the present invention.

Referring to FIG. 4, once a user presses the power switch 105, an event of awakening from a "suspend to memory" state and reuming occurs to the computer motherboard 20 (for example, an event of "awakening from ACPI S3 to S0" occurs to the computer motherboard 20); meanwhile, the power-saving electronic device 10 performs the aforesaid power-restoring functionality, so as to resume power supply to the south bridge chip 205, the SIO chip 203, the SPI ROM, the LAN chip, and the audio chip (S501). Furthermore, in S501, the power-saving electronic device 10 enables switching of the memory power controller 211 such that the power 30c forms a close circuit with the memory controller 207 and the main memory 209. Then, the south bridge chip 205 enters a power on state (S502). Afterward, the flag is read by the code 40a in the BIOS 40 to check and determine whether the flag is set and determine, upon a determination of a TRUTH result (i.e., the flag is set), whether a preceding state of the computer motherboard 20 is the "suspend to memory" state. Then, the code 40a enables the south bridge chip 205 to execute an event of awakening from the "suspend to memory" state (S503). Furthermore, in S503, the code 40a clears the flag value. Afterward, the window operating system reads the main memory 209 and restores related data (S504). Lastly, the computer motherboard 20 awakens and resumes from the "suspend to memory" state (S505).

The steps S502, S504, and S505 illustrated with FIG. 4 are attributable to the prior art related to a known way to cope with an event of awakening from a "suspend to memory" state and restoring. It should be noted that, compared to the prior art, the present invention includes new steps, such as S501 and S503, so as to allow the computer motherboard 20 to awaken from a "suspend to memory" state and resume even after power supply to the south bridge chip 205 and SIO chip 203 has been interrupted.

The memory unit 210 is a built-in CMOS memory of the computer motherboard 20, a built-in embedded controller (EC) of a notebook computer, or an internal register of the second device 103.

As disclosed in the present invention, a power-saving electronic device for use with a computer motherboard is capable of compelling interruption of power supply to a south bridge chip and a super input output (SIO) chip of the computer motherboard in a "suspend to memory" state so as to save power, and yet enables the computer motherboard to remain capable of awakening and resuming from the S3 state, which are the advantages and characteristics of the present invention.

The above description serves to expound preferred embodiments of the present invention rather than limit the scope of application of the present invention. Persons skilled in the art should be able to make obvious changes or modification of the present invention without departing from the substantive disclosure of the present invention.

What is claimed is:

1. A power-saving electronic device for use with a computer motherboard in a "suspend to memory" state, comprising:
   a first device controlled by a second device and configured to controllably determine whether a first standby power forms a close circuit or an open circuit with a south bridge chip and a super input output (SIO) chip of the computer motherboard; and
   the second device for determining whether the computer motherboard is in the "suspend to memory" state so as for the first standby power to form an open circuit with the south bridge chip and the SIO chip under control of the first device upon a positive determination, determining whether the computer motherboard is in the "suspend to memory" state so as for a second standby power to form a close circuit with a memory controller and a main memory of the computer motherboard upon a positive determination, receiving a power switch signal generated by a power switch, and enabling the first standby power to form a close circuit with the south bridge chip and the SIO chip under control of the first device upon receipt of the power switch signal.

2. The power-saving electronic device of claim 1, wherein the "suspend to memory" state is an S3 state of Advanced Configuration and Power Interface (ACPI).

3. The power-saving electronic device of claim 1, further comprising a memory power controller for switching to the power source of the memory controller and the main memory, wherein, when the computer motherboard is in the "suspend to memory" state, the memory power controller is controlled by the second device and switches the power source of the memory controller and the main memory to the second standby power.

4. The power-saving electronic device of claim 1, wherein the first standby power originates in standby power of a power supply.

5. The power-saving electronic device of claim 1, wherein the second standby power originates in standby power of a power supply.

6. The power-saving electronic device of claim 1, further comprising a charge pump circuit unit.

7. The power-saving electronic device of claim 1, further comprising a soft start circuit unit.

8. The power-saving electronic device of claim 1, wherein the power-saving electronic device is integrated with the super input output (SIO) chip.

9. The power-saving electronic device of claim 1, wherein the second device is a micro-controller or an application-specific integrated circuit (ASIC).

10. The power-saving electronic device of claim 1, wherein the second device reproduces the power switch signal and sends a power switch signal thus reproduced to the SIO chip.

11. The power-saving electronic device of claim 10, wherein the second device reproduces the power switch signal and sends the power switch signal thus reproduced to the SIO chip, by a means of executing instruction codes to control a voltage level at an output port of the second device.

12. A computer motherboard, comprising:
a south bridge chip electrically connected to a first device;
a super input output (SIO) chip electrically connected to the first device;
the first device controlled by a second device and configured to controllably determine whether a first standby power forms a close circuit or an open circuit with the south bridge chip and the SIO chip;
the second device for determining whether the computer motherboard is in the "suspend to memory" state so as for the first standby power to form an open circuit with the south bridge chip and the SIO chip under control of the first device upon a positive determination, determining whether the computer motherboard is in the "suspend to memory" state so as for a second standby power to form the close circuit with a memory controller and a main memory of the computer motherboard upon a positive determination, receiving a power switch signal generated by a power switch, and enabling the first standby power to form the close circuit with the south bridge chip and the SIO chip under control of the first device upon receipt of the power switch signal; and
a basic input and output system (BIOS) comprising a code for use in: storing a flag in a memory unit whenever the computer motherboard is in the "suspend to memory" state;
checking the flag and determining whether a preceding state of the computer motherboard is the "suspend to memory" state as soon as power supply to the south bridge chip and the SIO chip resumes; and executing, upon a positive determination, awakening and resuming from the "suspend to memory" state.

13. The computer motherboard of claim 12, wherein the "suspend to memory" state is an S3 state of Advanced Configuration and Power Interface (ACPI).

14. The computer motherboard of claim 12, further comprising a memory power controller for switching the power source of the memory controller and the main memory, wherein, when the computer motherboard is in the "suspend to memory" state, the memory power controller is controlled by the second device and switches the power source of the memory controller and the main memory to the second standby power.

15. The computer motherboard of claim 12, further comprising a charge pump circuit unit.

16. The computer motherboard of claim 12, further comprising a soft start circuit unit.

17. The computer motherboard of claim 12, wherein the first device and the second device are integrated with the super input output (SIO) chip.

18. The computer motherboard of claim 12, wherein the second device is a micro-controller or an application-specific integrated circuit (ASIC).

19. The computer motherboard of claim 12, wherein the second device reproduces the power switch signal and sends a power switch signal thus reproduced to the SIO chip of the computer motherboard.

20. The computer motherboard of claim 19, wherein the second device reproduces the power switch signal and sends the power switch signal thus reproduced to the SIO chip, by a means of executing instruction codes to control a voltage level at an output port of the second device.

21. The computer motherboard of claim 12, wherein the memory unit is a built-in CMOS memory of the computer motherboard, a built-in embedded controller (EC) of a notebook computer, or an internal register of the second device.

* * * * *